(12) United States Patent
Seel et al.

(10) Patent No.: US 6,299,234 B1
(45) Date of Patent: Oct. 9, 2001

(54) HARD-TOP VEHICLE

(75) Inventors: Holger Seel; Kurt Schaible, both of Aidlingen; Bernhard Schenk, Boeblingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/001,399

(22) Filed: Jan. 7, 1998

Related U.S. Application Data

(62) Division of application No. 08/580,020, filed on Dec. 20, 1995, now Pat. No. 5,756,470.

(30) Foreign Application Priority Data

Dec. 20, 1994 (DE) .................................................. 44 45 580

(51) Int. Cl.$^7$ ...................................................... B60J 7/14
(52) U.S. Cl. ............... 296/108; 296/107.12; 296/107.17; 296/107.2
(58) Field of Search ........................ 296/107.12, 107.17, 296/107.19, 107.2, 108

(56) References Cited

U.S. PATENT DOCUMENTS

| | | | |
|---|---|---|---|
| 3,021,174 | * | 2/1962 | Rund ................................. 296/107.2 |
| 3,575,464 | * | 4/1971 | Himka et al. ........................ 296/117 |
| 4,844,534 | * | 7/1989 | Boots ................................... 296/214 |

FOREIGN PATENT DOCUMENTS

| | | | |
|---|---|---|---|
| 650980 | * | 8/1985 | (CH) ................................... 296/108 |
| 3635887 | * | 5/1988 | (DE) ................................... 296/108 |
| 43 20 468 | | 10/1994 | (DE) . |

* cited by examiner

Primary Examiner—Dennis H. Pedder
(74) Attorney, Agent, or Firm—Crowell & Moring LLP

(57) ABSTRACT

A hard-top vehicle is provided with a roof structure which includes a roof part and a rear-window part connected pivotably thereto. The roof structure is lowered from a closed position, in which it bears in the region of a front windscreen frame and covers the rear-passenger-compartment region, into an open position, towards the tail-end region of the vehicle, via a positive-control device. The positive control device is supported in the tail-end region of the vehicle bodywork and can be pivoted about a tail-end pivot pin fixed to the vehicle, into a folding-top compartment. The positive-control device includes at least one control element which is connected in a rotationally fixed manner to the roof part in the region of a roof pivot pin. In this arrangement, the control element is designed as a linkage which acts on a guide part, in the region of the roof pivot pin, with a guide rod and a main guide rod.

8 Claims, 12 Drawing Sheets

HARD-TOP VEHICLE

This application is a division of application Ser. No. 08/580,020, filed Dec. 20, 1995, now Ser. No. 5,756,470.

BACKGROUND AND SUMMARY OF THE INVENTION

The invention relates to a hard-top vehicle having a roof structure which includes a roof part and a rear-window part connected pivotably thereto. The roof structure can be lowered from a closed position, in which it bears against a front windscreen frame and covers the rear-passenger-compartment region, into an open position, towards the tail-end region of the vehicle, via a positive-control device. The positive-control device is supported in the tail-end region of the vehicle bodywork and can be pivoted about a tail-end pivot pin fixed to the vehicle, into a folding-top compartment. The positive-control device has at least one control element which is connected in a rotationally fixed manner to the roof part in the region of a roof pivot pin.

In the case of known hard-top vehicles of the above-mentioned type, such as in German Patent document DE 43 20 468, the two-part roof structure, which includes a roof part and a rear-window part, is provided with an automatic pivot drive. The automatic pivot drive makes it possible for the roof parts to be pivoted, both during the opening and during the closing operations, over a pivot path which is essentially in the form of a circular arc. In this arrangement, the front region of the roof part is also moved, in the last movement phase during the closing operation, towards the region of the windscreen frame on the circle-arc pivot path. The has the result that considerable structural outlay is necessary in the region of the connecting parts in order to avoid leakages between the roof part and the windscreen frame, in particular during an automatic closing operation.

There is therefore needed a hardtop vehicle whose positive-control elements, connected to the roof parts, make it possible for the roof structure to be moved automatically into a reliably sealed closed position in the region of the windscreen frame, with a low degree of technical outlay and with a low space requirement.

These needs are met according to the present invention by a hard-top vehicle having a roof structure including a roof part and a pivotably connected rear-window part. The roof structure can be lowered from a closed position, in which it bears against a front windscreen frame and covers the rear-passenger-compartment region, into an open position, towards the tail-end region of the vehicle, via a positive-control device. The positive-control device is supported in the tail-end region of the vehicle bodywork and can be pivoted about a tail-end pivot pin fixed to the vehicle, into a folding-top compartment. The positive-control device has at least one control element which is connected in a rotationally fixed manner to the roof part in the region of a roof pivot pin. The control element is designed as a linkage. In the region of the roof pivot pin, the linkage acts on a guide part with a guide rod and a main guide rod, such that the linkage forms, with at least one pivot link supported in the region of the tail-end pivot pin and connected to a drive member, a link parallelogram which simultaneously moves the roof part and the rear-window part.

The hard-top vehicle configured according to the present invention exhibits, with the linkage, a component combination which interacts with the two roof parts as pivot and guide element. With the guide rod and the main guide rod, the component combination permits a pivot movement, initiated merely via two drive cylinders, of the roof part and of the rear-window part into the open position as well as the return thereof from the folding-top compartment towards the windscreen frame. This has the effect of a combined pivot/sliding movement with a virtually horizontal approach to the windscreen frame.

In this arrangement, the linkage components and the roof part form a link parallelogram. With a low degree of technical outlay by way of a change in the dimensions of the components, the link parallelogram permits the respective pivot path of the roof structure to be influenced. This is done such that, in the last movement phase of the pivot movement during the closing operation, the roof structure passes into a flat closed curvilinear path. As a result, precise mutual positioning of the two border regions of the wind screen frame and of the roof part, which are to be connected to one another, is achieved. Thereafter, the mutual locking of the components is made possible by a short horizontal thrust movement.

In the installed position, the linkage components are supported on the bodywork in the region of respective bearing blocks and can be moved via these bearing blocks with an advantageously low space requirement such that, in the open position, the linkage parts can be lowered into a receiving chamber located beneath a top-rim line of the bodywork. This thus forms, overall, a visually more pleasing transition region between-the rear passenger compartment of the vehicle and the tall-end part.

The overall compact linkage permits, with a small number of bearing locations, extremely precise movement and positioning adjustment of the roof structure. In an especially advantageous design, the roof part may be provided, with a guide and adjustment member in the region of the guide part. The guide and adjustment member permits preliminary adjustment of the connecting position of the roof part and the windscreen frame. Consequently, the entire roof structure may be adjusted, in a pre-assembled state, with a low degree of outlay, for example on an auxiliary apparatus, such that the pivot path of the roof structure permits optimum connection of the components. Furthermore, with low setting forces which thus do not adversely affect the materials, the components can be moved into the open and/or closed positions with high repetition accuracy.

Other objects, advantages and novel features of the present invention will become apparent from the following detailed description of the invention when considered in conjunction with the accompanying drawings.

DETAILED DESCRIPTION OF THE DRAWINGS

Figure 1:
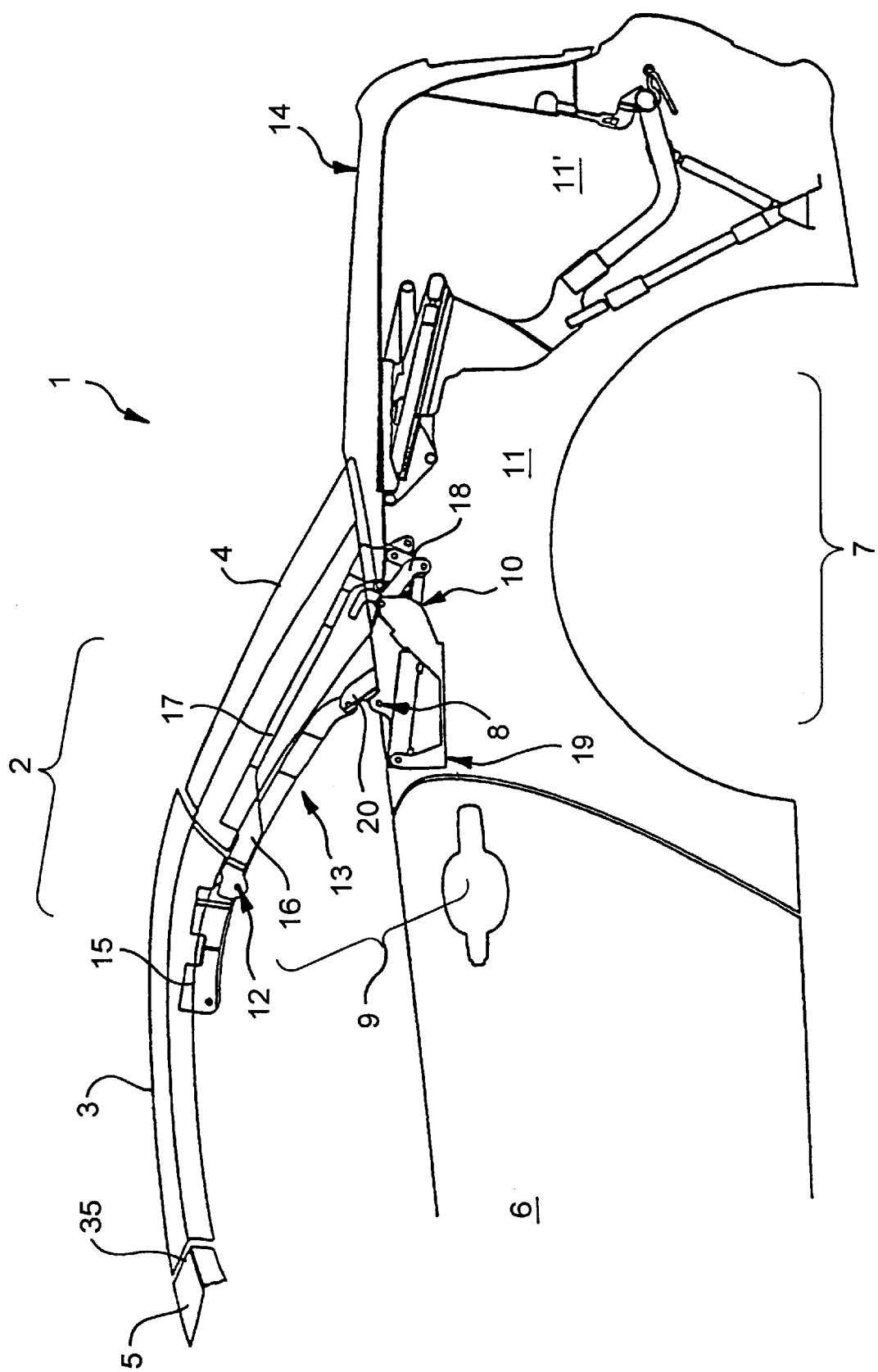
FIG. 1 is a schematic side view in the region of the tail-end vehicle bodywork of a hard-top vehicle, and of a roof structure according to the present invention.
Figure 2:
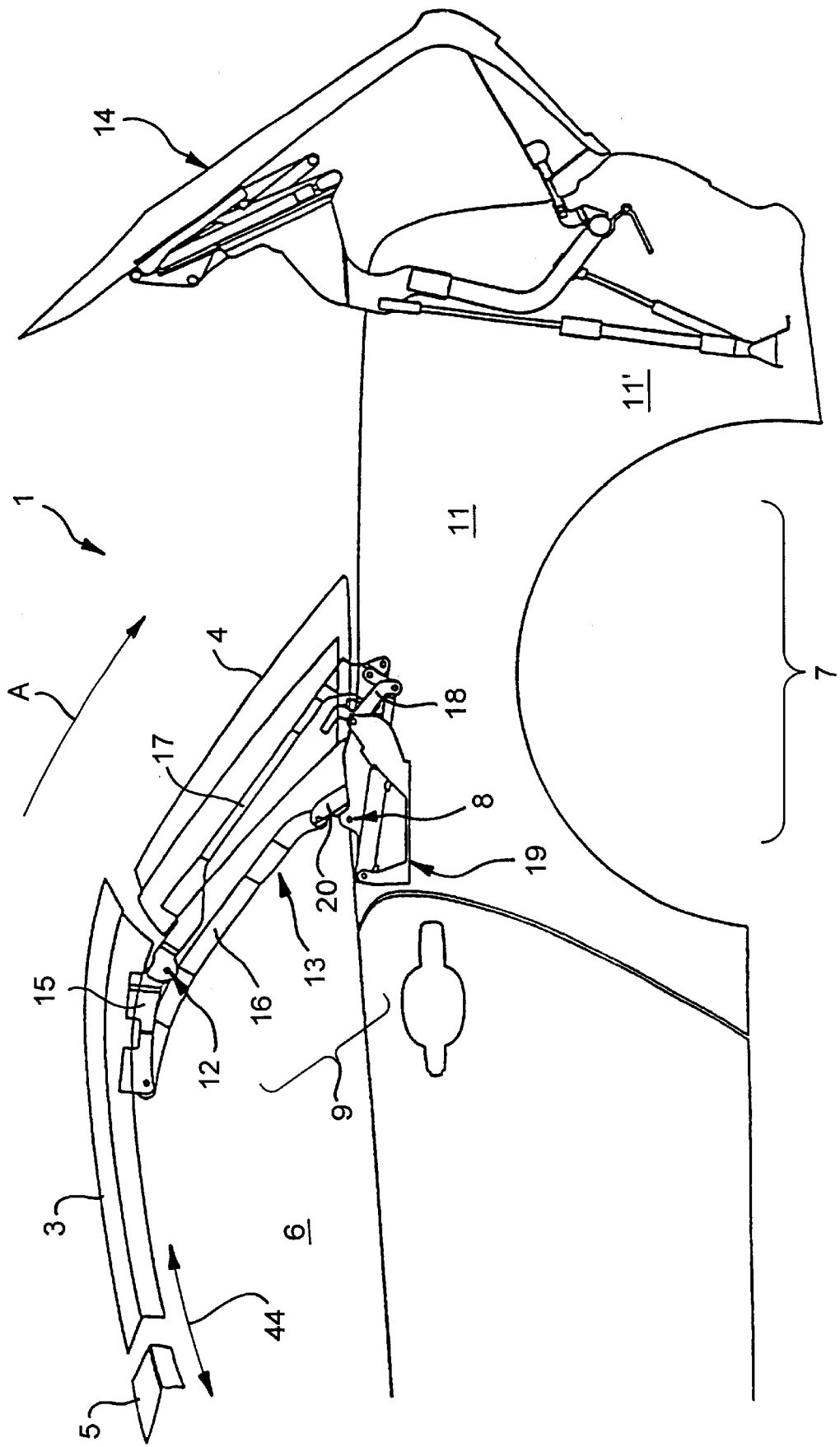
FIG. 2 is a schematic side view of a hard-top vehicle, similar to FIG. 1, with a tailgate shown in an open position for an opening movement phase of the roof structure toward a tail-end folding-top compartment.
Figure 3:
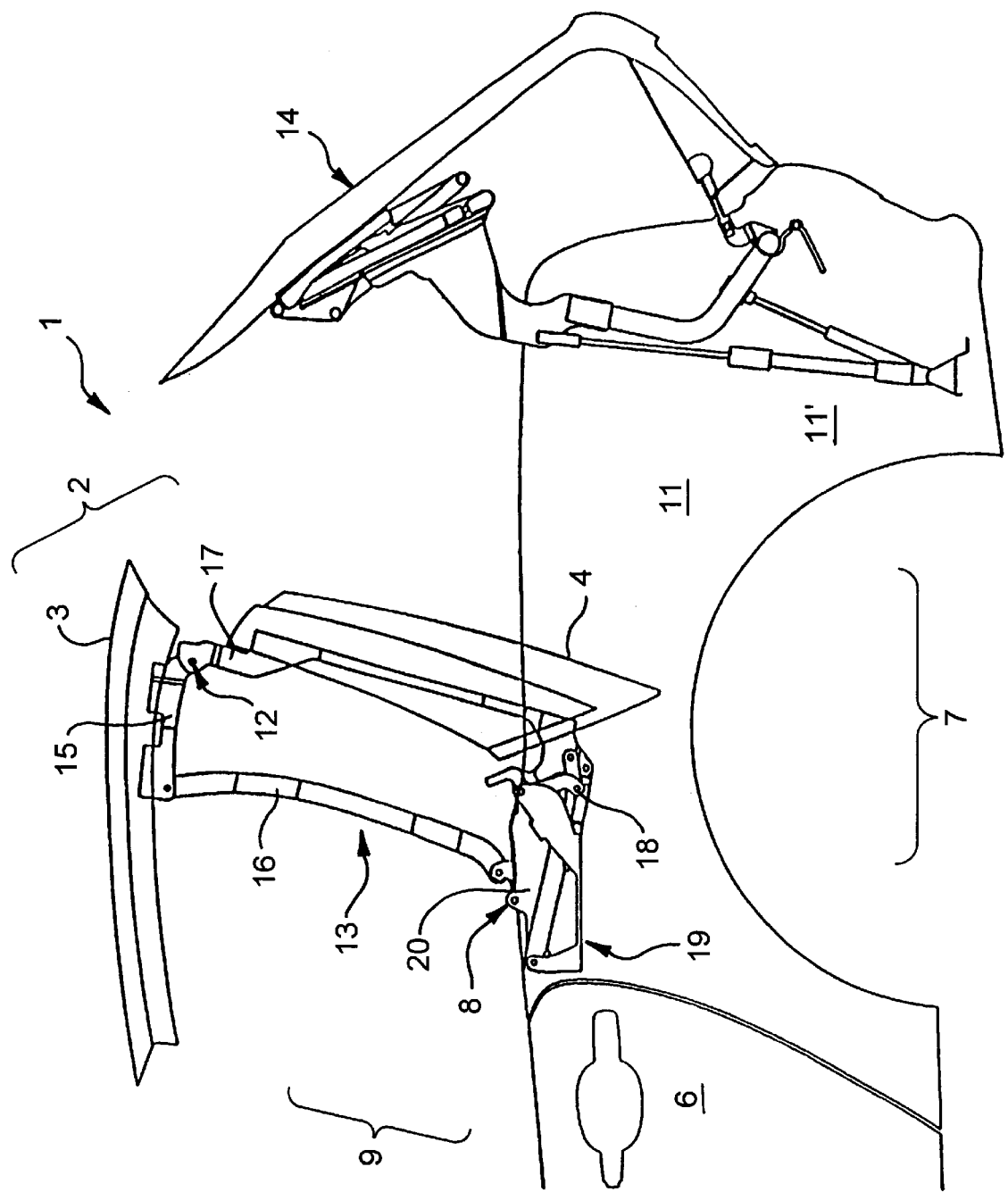
FIG. 3 is a schematic side view of a hard-top vehicle, similar to FIG. 2, with a further movement phase of the roof structure towards a tail-end folding-top compartment shown.
Figure 4:
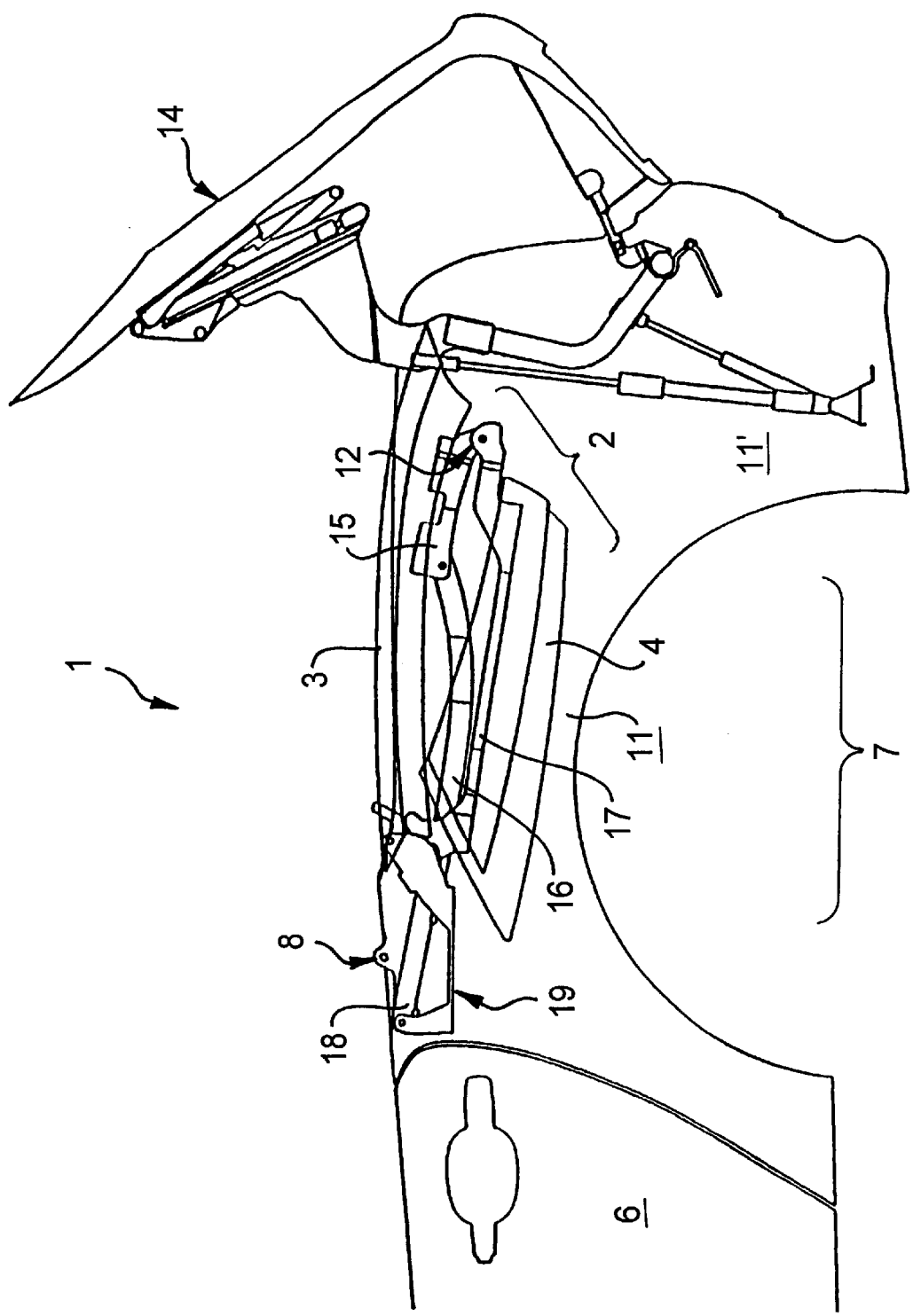
FIG. 4 is a schematic side view of a hard-top vehicle, similar to FIG. 2, with a further movement phase of the roof structure towards a tail-end folding-top compartment shown.

The tail-end region of the vehicle bodywork of a hard-top vehicle, designated generally by 1, is illustrated in a schematic representation in FIG. 1. From FIG. 1, the functional connection of the components located along a vehicle longitudinal side region becomes clear. It goes without saying for the further description, of course, that an identical component arrangement is symmetrically provided with respect to the vehicle longitudinal axis on the opposite vehicle longitudinal side region.

The hard-top vehicle 1 is provided with a roof structure 2 which includes a roof part 3 and a rear-window part 4 connected pivotably thereto. In the depicted closed position of the roof structure 2 in accordance with FIG. 1, the roof part 3 bears in the region of a windscreen frame 5 such that a rear-passenger-compartment region 6 of the vehicle is covered.

In this arrangement, the roof structure 2 is provided, in the tail-end region 7 of the vehicle bodywork, with a positive-control device 9 which can be pivoted about a tail-end pivot pin 8 fixed to the vehicle. By means of the positive-control device 9, the entire roof structure 2, upon initiation of a pivot movement, for example via a drive member 10 formed by a hydraulic cylinder, can be released from the windscreen frame 5 (arrow A) and moved into a folding-top compartment 11 provided in the tail-end region 7 of the vehicle. In this arrangement, the movement phases represented in FIGS. 2 to 5 illustrate the movement principle of the roof structure 2. The roof part 3 of the roof structure is connected in a rotationally fixed manner to the positive-control device 9, via a control element 13, in the region of a roof pivot pin 12.

Figure 5:
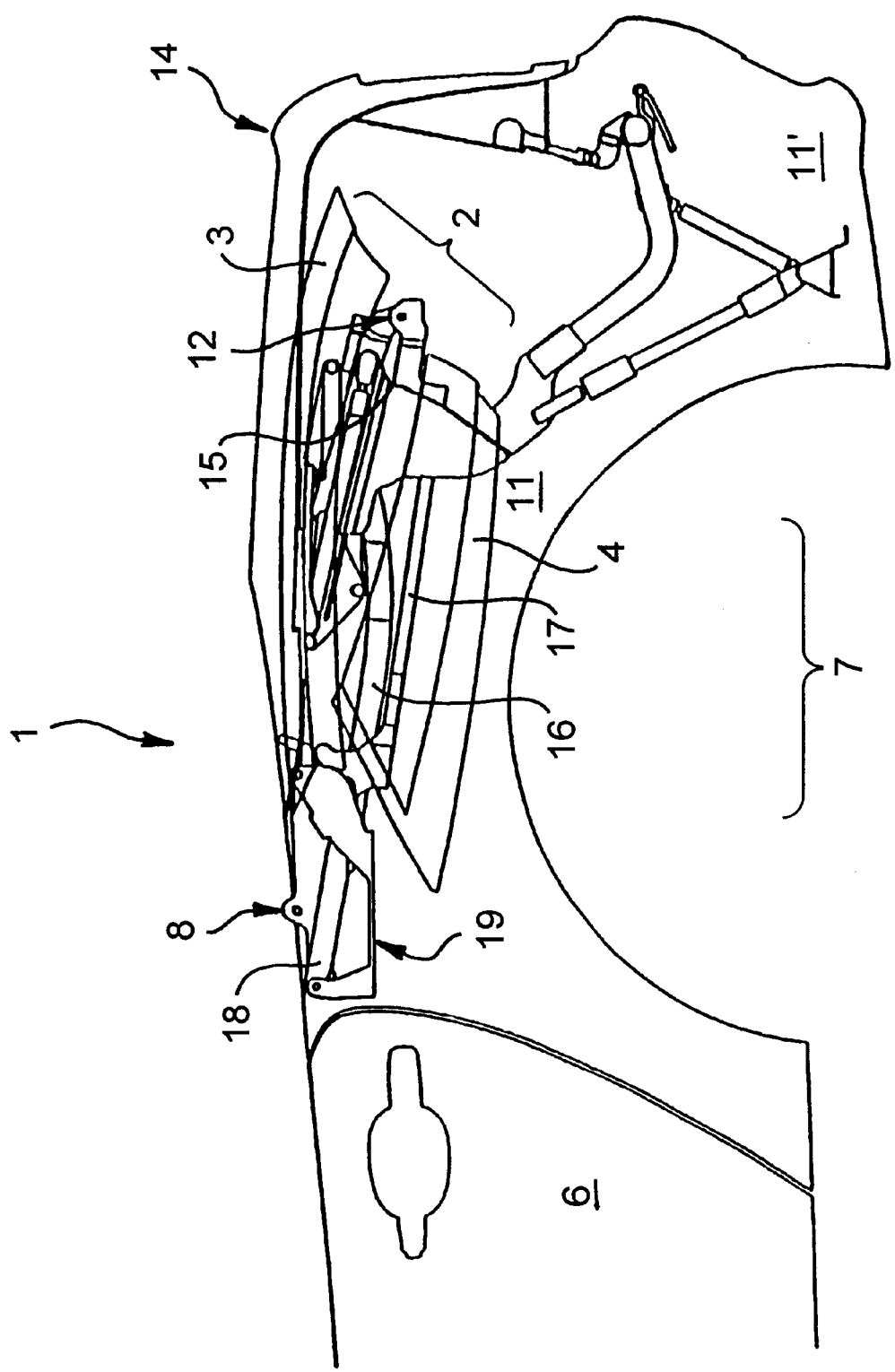
FIG. 5 is a schematic side view of a hard-top vehicle, similar to FIG. 4, with the roof structure shown in its fully opened position.

Moreover, in the tail-end region 7, a tailgate 14 is provided. After being pivoted into the open position (FIG. 2) and once the roof structure 2 has been pivoted into the folding-top compartment 11. The tailgate 14 is moved into a closed position in which it covers the folding-top compartment and a boot region 11' (FIG. 5).

In the first embodiment of the roof structure 2 in accordance with FIGS. 1 to 9, the control element 13 is designed as a linkage. The linkage 13 acts on a guide part 15, in the region of the roof pivot pin 12, with a guide rod 16 and a main guide rod 17. The linkage forms together with a pivot link 18 supported in the region of the tail-end pivot pin 8 and connected to the drive member 10, a link parallelogram which simultaneously moves the roof part 3 and the rear-window part 4.

In an advantageous design, the entire roof structure 2 is supported, in the region of the tail-end pivot pin 8 located on a bearing block 19, via an additional intermediate link 20. At one end, the guide rod 16 is articulated on the intermediate link and, at the other end, the pivot link 18 directed towards the main guide rod 17 (FIG. 9).

Figure 6:
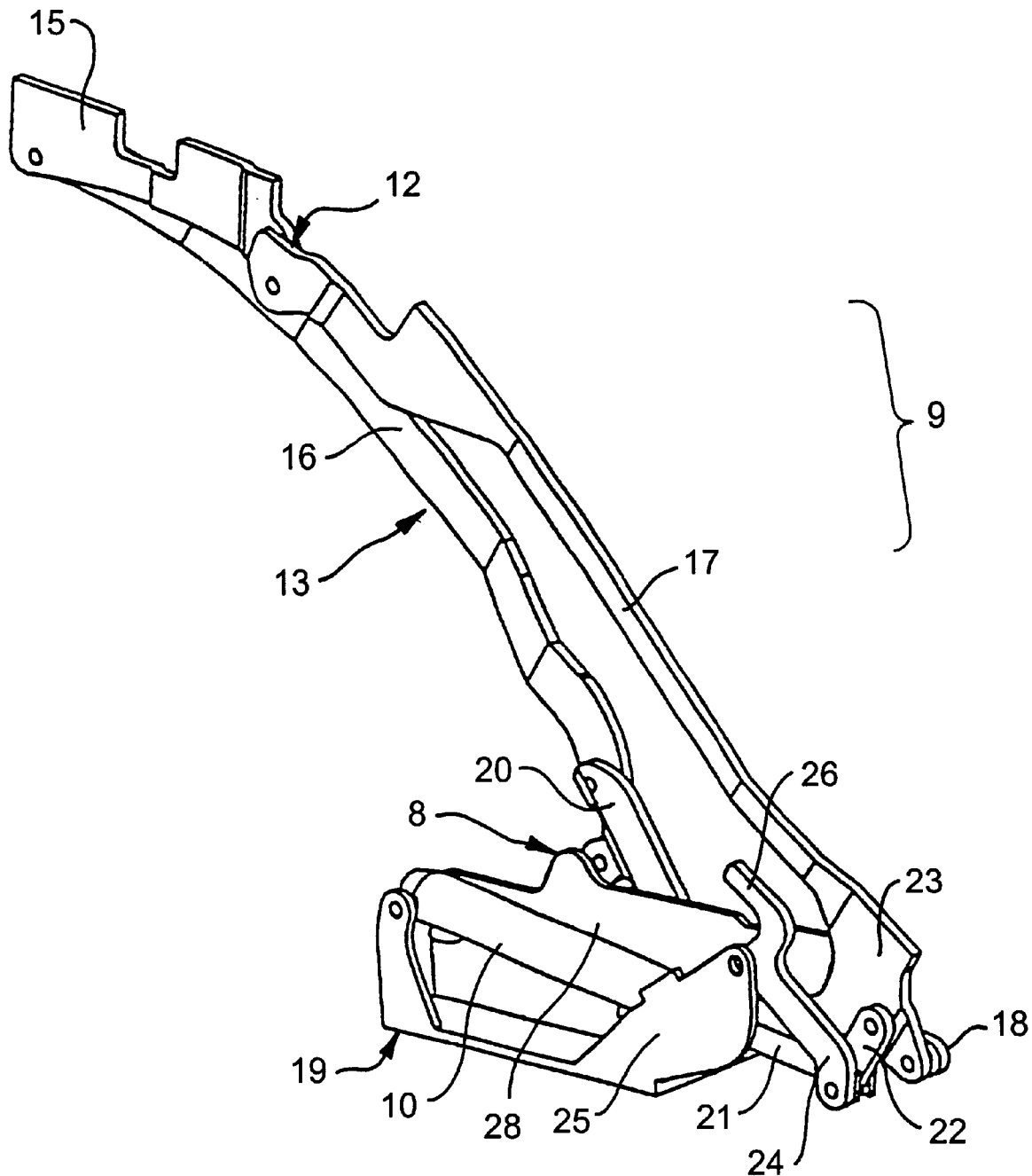
FIG. 6 is an inner view of a linkage provided in each case on both sides of the roof structure, the linkage being represented in isolation.
Figure 7:
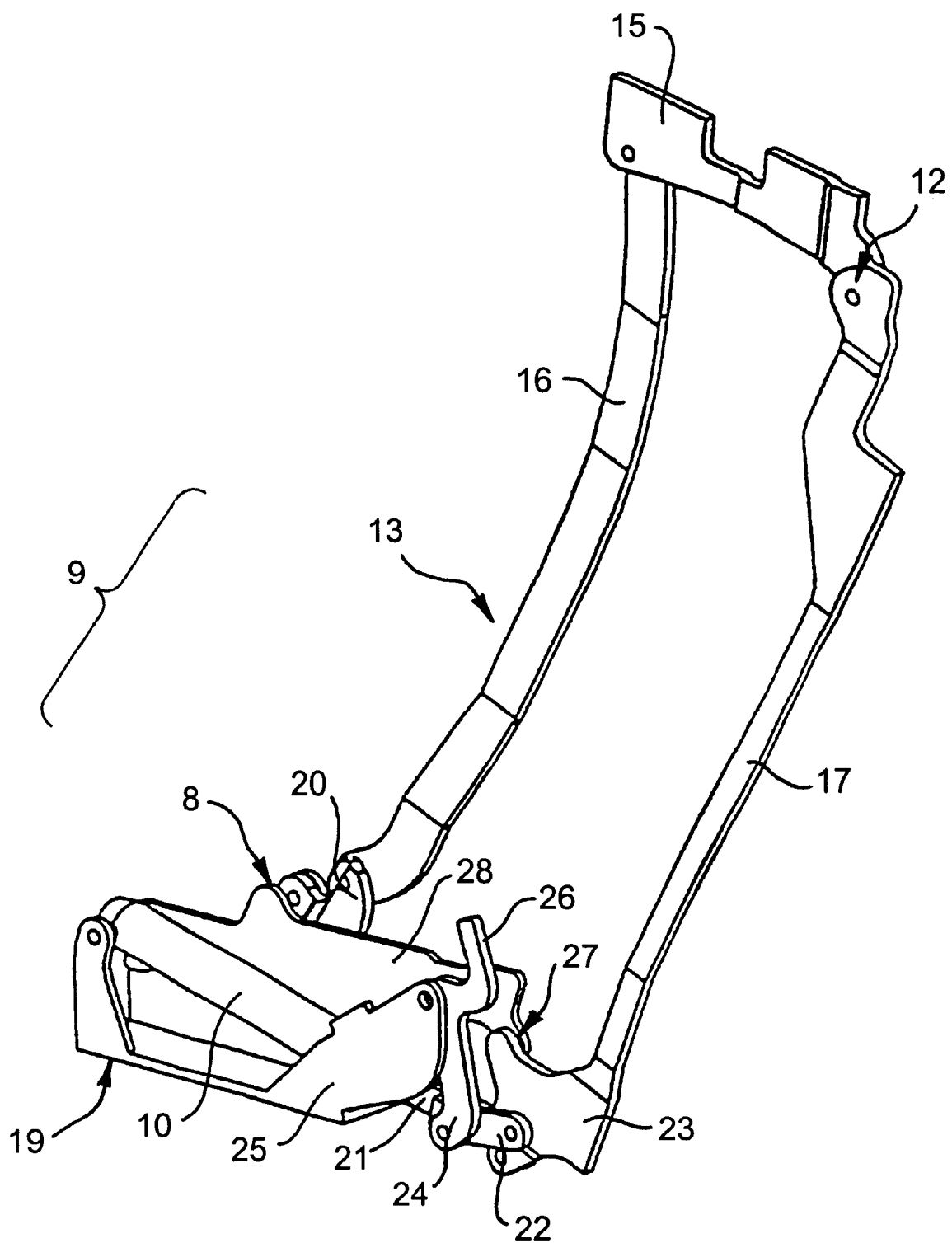
FIG. 7 is an inner view similar to FIG. 6, with a different movement phase of the linkage shown.
Figure 8:
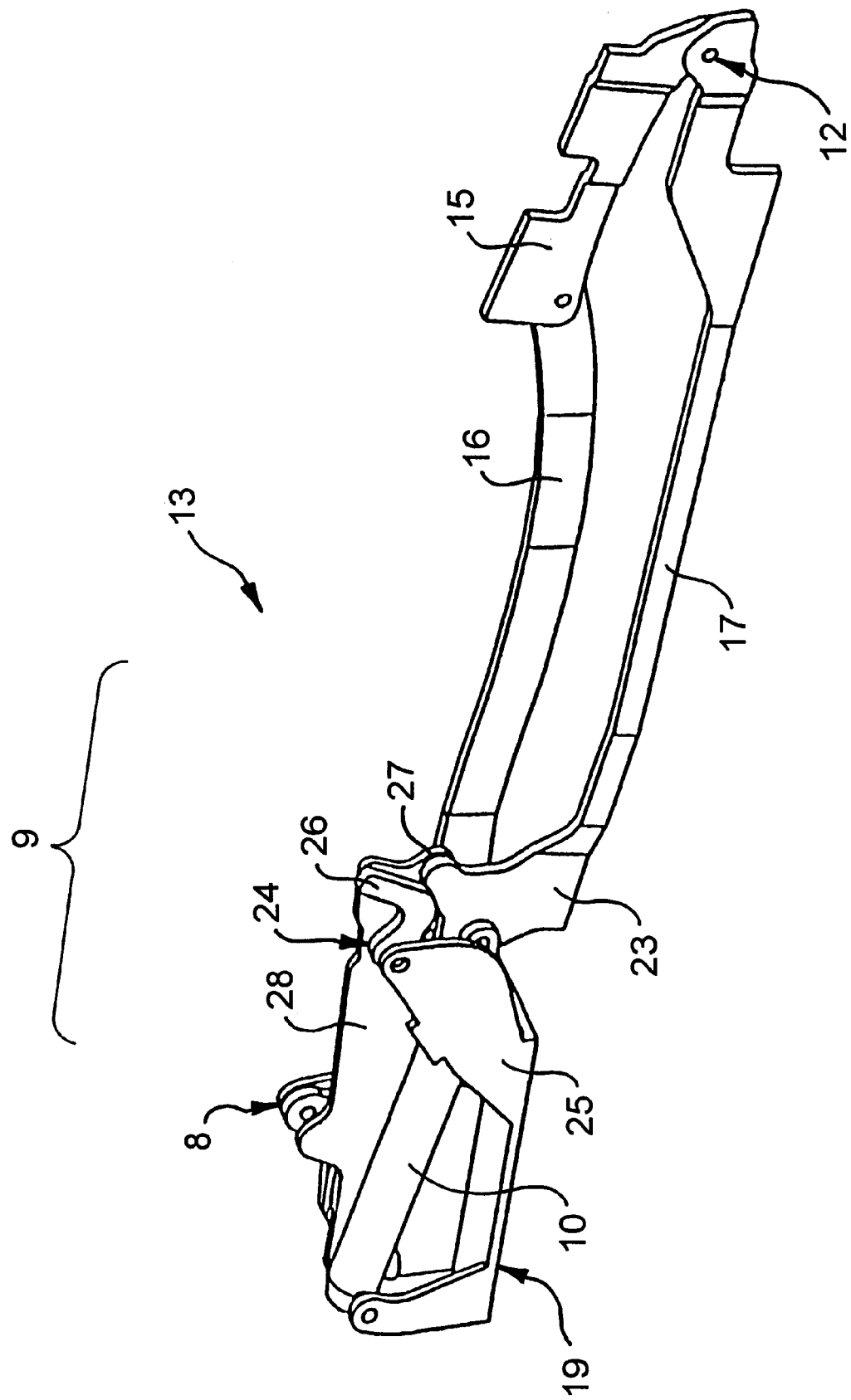
FIG. 8 is an inner view similar to FIG. 6, with a different movement phase of the linkage shown.

In order to initiate movement in the roof structure 2, the drive member 10 acts with a piston rod 21, via an angle lever 22, on the main guide rod 17 in the region of a bearing plate 23 located at the end of said main guide rod. The drive member 10 is designed as a hydraulic cylinder. Moreover, a rocker 24 is provided in the common connection region of the angle lever 22 and the piston rod 21. The rocker 24, at one end, is articulated on the piston rod 21 and, at the other end, can be pivoted about a supporting bearing 25 supported on the bearing block 19 (FIG. 6). In this arrangement, there may be provided, in an advantageous design, at a free end of the rocker 24, a pushing extension 26 (FIG. 8) which projects upwards beyond the bearing block 19. The pushing extension 26 interacts, for example, with an upper covering part (not shown) in the tail-end region 7 when the roof structure 2 is pivoted out of the folding top compartment 11 (FIG. 5).

Using the above-described components, the roof structure 2 can be displaced extremely smoothly into the open position (FIG. 4), in which it is lowered into the folding-top compartment 11. In the open position, the control element 13 formed by the linkage can be pivoted into a stable end position (FIG. 8), forming a support in the manner of a toggle lever, and can be moved back again into the closed position (FIG. 1) via the drive member 10.

Figure 9:
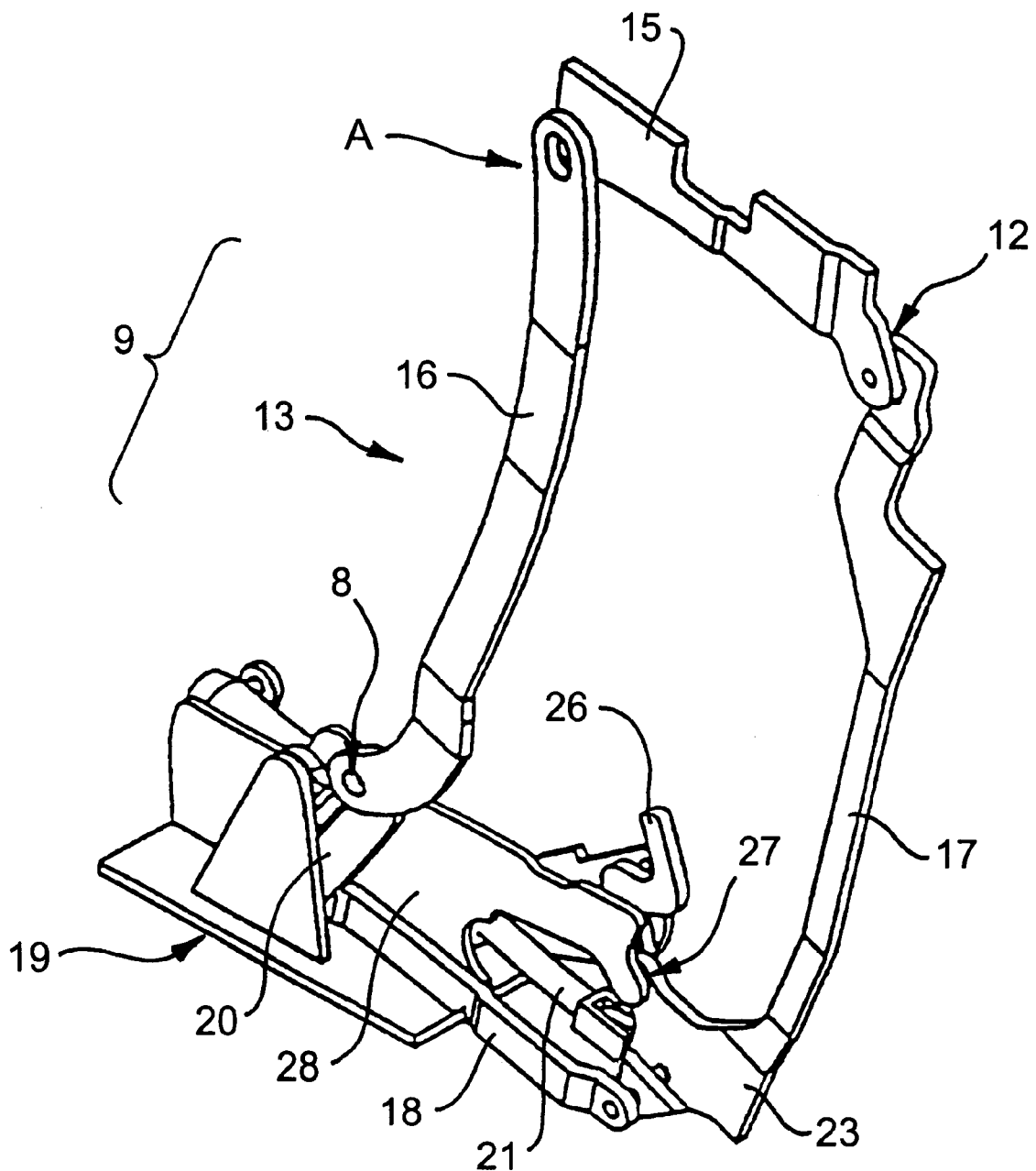
FIG. 9 is an outer view of the linkage in a movement phase similar to FIG. 7.

The representation in accordance with FIG. 9 illustrates, moreover, that, via a pivot bearing 27 provided in the front end region of the bearing plate 23, the main guide rod 17 is connected directly to the bearing block 19, which bears the linkage, in the region of a main supporting plate 28.

Figure 10:
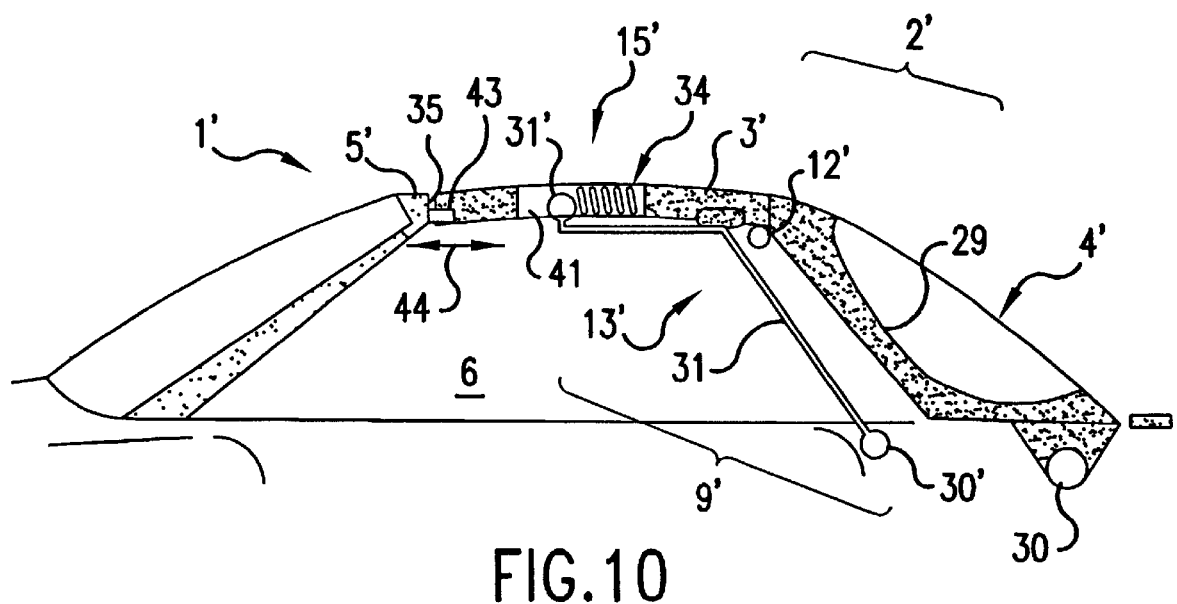
FIG. 10 is a basic representation of the hardtop vehicle having a roof structure of a second embodiment.
Figure 11:
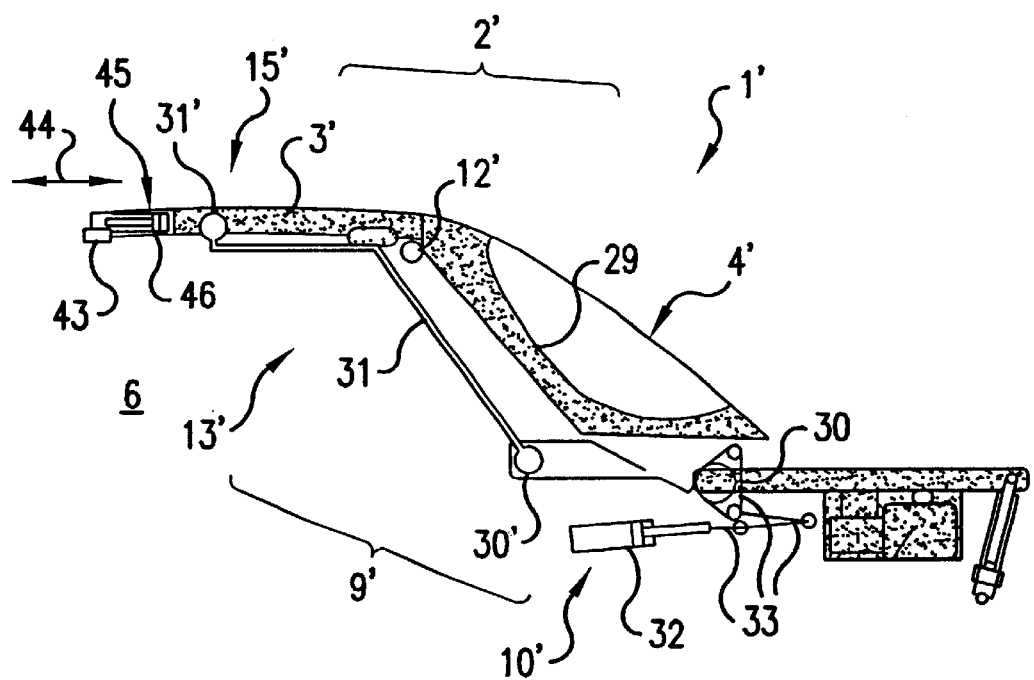
FIG. 11 is a basic representation similar to FIG. 10, with a drive device acting on the roof structure.
Figure 12:
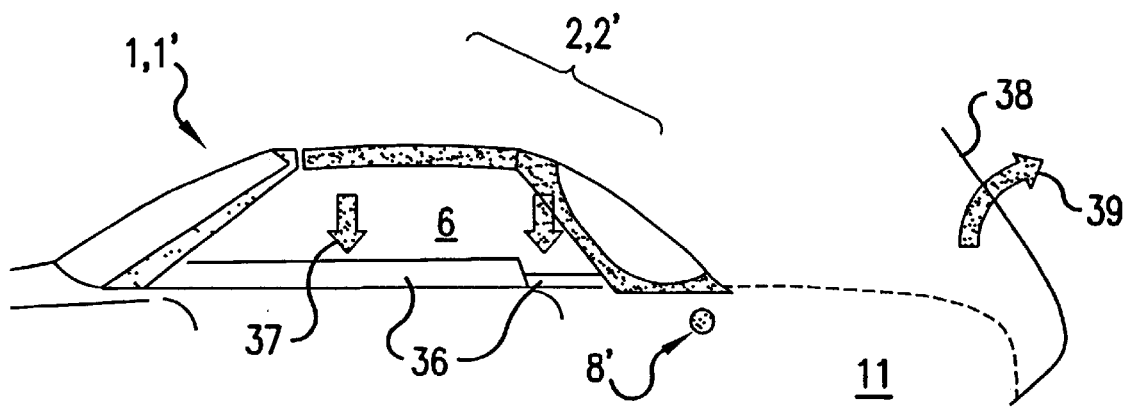
FIG. 12 is a basic representation of the hard-top vehicle with the components located at the beginning of an opening phase of operation.

FIGS. 10 and 11 illustrate a second embodiment of a positive-control device 9', which likewise exhibits a control element 13' which forms a link parallelogram and is connected in the form of a linkage to the roof structure 2'. In this arrangement, the linkage is formed directly by the rear-window part 4', provided as a stable carrying frame 29 and supported on the bodywork via a pivot bearing 30, and by a link rod 31, likewise supported on the tail end in a bearing part 30' and bearing the roof part 3'.

In order to initiate the above-described pivot movements in the roof structure 2', there is provided as the drive member 10', in the region of the pivot bearing 30, a hydraulic cylinder 32 (FIG. 11). The hydraulic cylinder 32 acts on the carrying frame 29 and, via corresponding deflection members 33, permits a pivot movement of the rear-window part 4' and the folding movement, running synchronously therewith, of the roof part 3' in the region of the roof pivot pin 12'.

In a preferred embodiment, the link rod 31 is provided in the region of a connecting part 31' directed towards the roof part 3' with a spring member 34 (FIG. 10). The spring member 34 forms the guide part 15'. By means of the spring member 34, in the last phase of the closing movement (not shown) towards the region of the windscreen frame 5', a thrust movement is achieved and it is possible to effect a connection with no adverse effect in the sealing gap 35.

Figure 13:
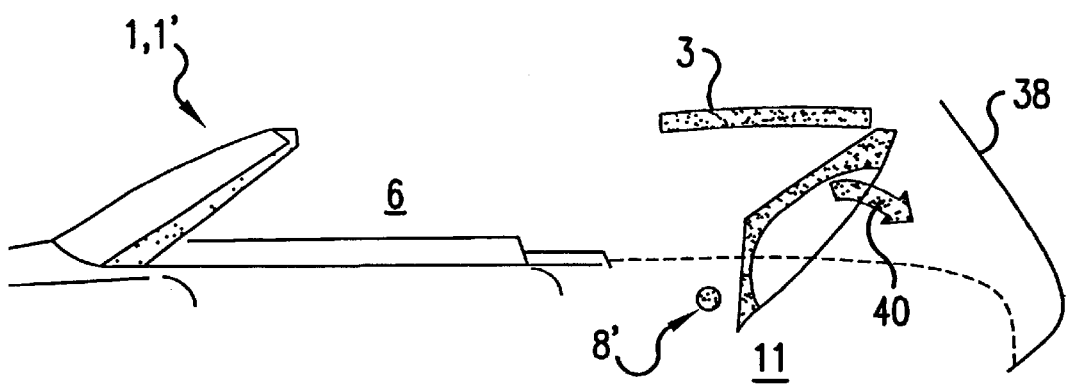
FIG. 13 is a basic representation of the hard-top vehicle with the components located in an intermediate phase of the opening operation.
Figure 14:
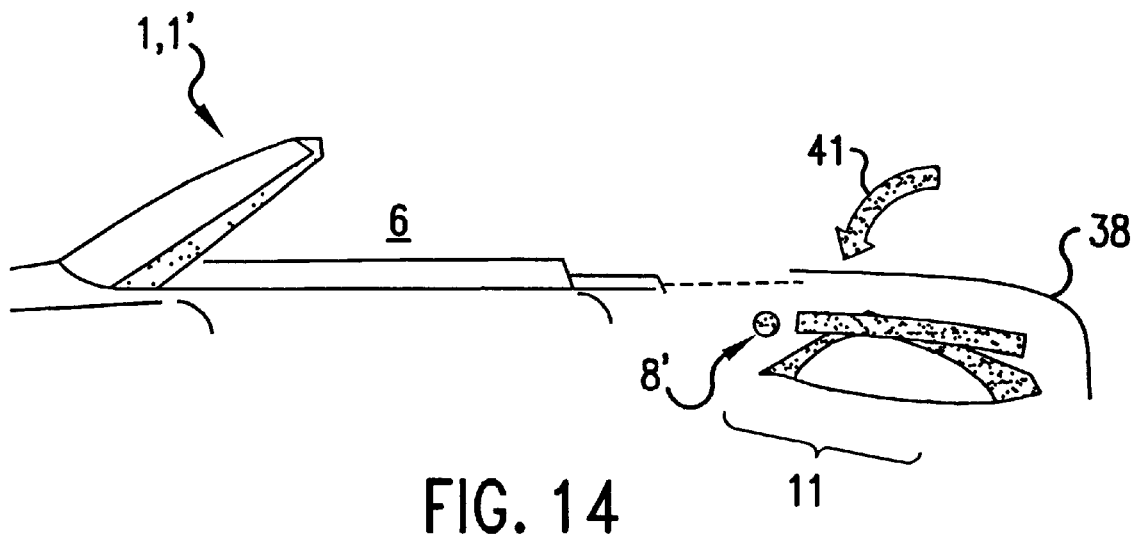
FIG. 14 is a basic representation of the hard-top vehicle with the components located in an end phase of the opening operation.
Figure 15:
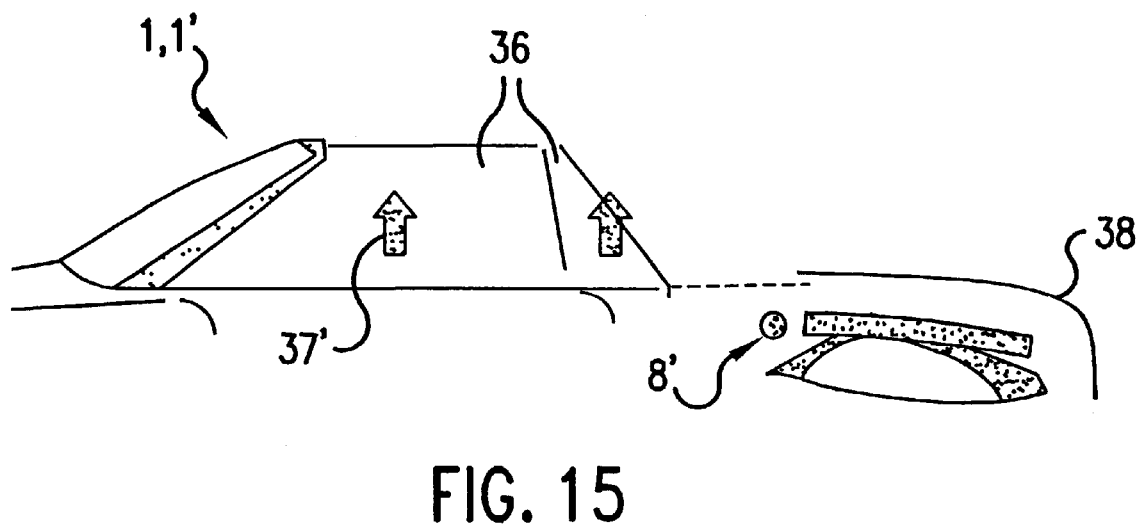
FIG. 15 is a basic representation of the hard-top vehicle with the components located in an end position of the opening operation with the side windows being closed.

FIGS. 12 to 15 schematically illustrate, in respective basic representations, the movement sequence of the individual components of the hard-top vehicle 1,1' during opening of the roof structure 2,2'. In this arrangement, after respective side windows 36 have been lowered in arrow direction 37, a tailgate 38 is pivoted into the open position (arrow 39 in FIG. 12) and, thereafter, the above-described rearward pivoting (arrow 40) of the roof structure 2,2' into the tail-end region of the vehicle towards the folding-top compartment 11 takes place (FIG. 13).

The roof structure 2,2', displaced into the folding-top compartment 11 of the vehicle, is then closed off in its stowed position (FIG. 14) by the tailgate 38, after the closing movement of the latter (arrow 41). Thereafter, the respective side windows 36 can be displaced up into the closed position again (FIG. 15), and the hard-top vehicle 1,1' is then ready for driving, with an open rear-passenger-compartment region.

The above-described movement sequence of the roof structures 2,2' is advantageously controlled in a stable manner via the respective control element 13,13' such that the quality of the kinematics as a whole is improved and, in this arrangement, the subjective and objective strengths of the entire system are ensured. In the same way, the production costs of the roof structure 2,2' can be reduced by using the control elements 13,13'.

The link parallelogram formed by the control elements 13,13' may also be designed, in the region of the part 31 for connection on the front roof part 3,3', as a slot 41 (FIG. 10). During the closing movement, the roof structure 2,2' moves on a curved path (not shown) predetermined by the control elements 13,13' and, upon reaching a movement phase in the vicinity of the windscreen frame 5, the roof part 3,3' can be pushed forwards in the slot 41, for example assisted by the spring member 34. As soon as the roof part 3,3' makes contact with the windscreen frame 5 in the region of a connecting member 43, the curved path of the roof structure 2,2' changes such that the latter is forced to merge into an essentially horizontal supporting movement directed forwardly toward the windscreen frame 5 (arrow 44 in FIGS. 2 and 10).

By means of the components of the linkage, the roof structure 2,2' makes it possible to produce the connection, in the region of the sealing gap 35, towards the windscreen frame 5 with a low sealing force, with the result that a connection with no adverse effects of the sealing parts provided here (not shown) is possible. In a preferred embodiment, the connection in the region of the sealing gap 35 may already be achieved by a closure part 45 (FIG. 11). The closure part 45 may expediently be designed as a hydraulic cylinder 46 located in the center of the roof part 3'. It is likewise conceivable to provide, in the region where the roof part 3,3' is connected to the windscreen frame 5, a snap-type closure (not shown), by means of which additional latching of the components is possible with a low degree of outlay in terms of force.

In a further embodiment, the roof structure 2,2' may be designed, in the region of the drive member 10, with a gas-filled spring device (not shown) which permits smooth actuation, in particular, in the case of a roof structure which is to be moved manually.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hard-top vehicle having a roof structure which bears against a front windscreen frame and covers a rear-passenger-compartment region in a closed position and which is pivoted into a folding-top compartment for an open position of the roof structure, comprising:

a roof part;

a rear-window part connected pivotably to said roof part about a roof pivot pin to form said roof structure;

a linkage control element moving both the roof part and rear-window part and which, together with a carrying frame of the rear window part, forms a substantially parallelogram configuration;

wherein said linkage control element comprises:

a) a guide part;

b) a guide rod and the carrying frame of the rear window part both pivotally connected to the guide part; and c) a body part, said guide rod and carrying frame being connected to the body part, and further comprising an adjustment and guide member provided in a region where said guide part and said roof part are connected, said adjustment and guide member allowing said roof part to move substantially horizontally toward the windscreen frame during a closing movement of said roof part.

2. A hard-top vehicle according to claim 1, wherein said carrying frame is pivotally connected on the body part via a pivot bearing; and wherein said guide rod is formed by a link rod which is supported on a tail-end region for bearing said roof part.

3. A hard-top vehicle according to claim 2, further comprising a drive member which comprises a hydraulic cylinder acting on the pivot bearing of said carrying frame.

4. An openable and closable roof structure for a vehicle, which is coupleable with a front windscreen frame of the vehicle, comprising:

a roof part of the roof structure;

a linkage control element forming a substantially parallelogram configuration, the linkage control element including a guide part operatively coupling with the roof part and a guide rod pivotally connected to the guide part; and wherein said linkage control element further comprises means for allowing substantially horizontal movement of the roof part toward the front windscreen frame in a closing operation of the roof structure.

5. An openable and closeable roof structure of a vehicle which bears against a windscreen frame in a closed position, the roof structure comprising:

a front roof part and a rear window part coupled pivotally to one another; and means for controlling movement of both the front roof part and rear window part about a curved path from a retracted position to a position near the windscreen frame, and means for allowing substantially horizontal movement of the front roof part in a directio n towards the windscreen frame to close a sealing gap.

6. The roof structure according to claim 5, wherein said control means comprises a linkage forming a substantially parallelogram configuration, and said allowing means includes a slot in which the front roof part moves in the substantially horizontal direction.

7. The roof structure according to claim 6, wherein said linkage comprises:
   a guide part rotationally fixed to the roof part;
   a guide rod pivotably connected to said guide part; and
   a main guide rod formed of one of a separate component and a portion of said rear window part, said main guide rod also being pivotably connected to said guide part, said guide slot being arranged in a region of the guide part which is rotationally fixed to the roof part.

8. An openable and closeable roof structure of a vehicle which bears against a windscreen frame in a closed position, the roof structure comprising:

a front roof part and a rear window part coupled pivotally to one another; and means for controlling movement of both the front roof part and rear window part about a curved path from a retracted position to a position near the windscreen frame, and means for allowing substantially horizontal movement of the front roof part in a direction towards the windscreen frame to close a sealing gap;

wherein said control means comprises a linkage forming a substantially parallelogram configuration, and said allowing means includes a guide slot in which is arranged a spring acting on a pivot of the linkage.

* * * * *